United States Patent
Kachi et al.

(10) Patent No.: US 6,644,446 B2
(45) Date of Patent: Nov. 11, 2003

(54) HYDRAULIC SHOCK-ABSORBER

(75) Inventors: Hajime Kachi, Nagoya (JP); Kotaro Kashiyama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 4 days.

(21) Appl. No.: 09/986,335

(22) Filed: Nov. 8, 2001

(65) Prior Publication Data

US 2002/0053495 A1 May 9, 2002

(30) Foreign Application Priority Data

Nov. 9, 2000 (JP) ........................... 2000-342192

(51) Int. Cl.[7] ................................. F16F 9/36
(52) U.S. Cl. ................. 188/322.17; 188/284
(58) Field of Search ............... 188/284, 322.16, 188/322.17

(56) References Cited

U.S. PATENT DOCUMENTS

| | | | | |
|---|---|---|---|---|
| 3,621,949 A | * | 11/1971 | Watson | 188/284 |
| 4,254,849 A | * | 3/1981 | Pohlenz | 137/38 |
| 4,335,871 A | * | 6/1982 | Molders | 141/3 |
| 4,884,665 A | * | 12/1989 | Parker et al. | 188/322.17 |
| 5,224,573 A | * | 7/1993 | Amemiya et al. | 188/315 |
| 5,667,041 A | * | 9/1997 | Jensen | 188/275 |
| 5,676,355 A | * | 10/1997 | Hayashi et al. | 188/322.12 |

FOREIGN PATENT DOCUMENTS

| | | |
|---|---|---|
| GB | 22373356 A | 5/1991 |
| JP | 2520280 | 9/1996 |
| JP | 10-281204 | 10/1998 |
| JP | 11-0218177 A | 8/1999 |
| JP | 2001-311446 A | 11/2001 |

* cited by examiner

*Primary Examiner*—Jack Lavinder
*Assistant Examiner*—Benjamin A Pezzlo
(74) *Attorney, Agent, or Firm*—Browdy and Neimark, P.L.L.C.

(57) ABSTRACT

In a hydraulic shock-absorber comprising a cylinder, a piston rod provided with a rebound stopper secured thereto, and a rod guide provided at an end of said cylinder which rod guide butts against the rebound stopper at an extension stroke end of the piston rod, the rod guide is formed of a plate and comprises, at the location of butting against the rebound stopper, a butting planar portion extending radially of the cylinder from a lower end of the inner cylindrical portion against which butting planar portion the rebound stopper butts, and a butting slant portion extending downward obliquely toward the cylinder from an outer end of the butting planar portion against which butting slant portion an radially outer portion of the rebound stopper butts, thereby enabling the rod guide to be prevented from being deformed and also allowing the piston rod to always slide smoothly.

3 Claims, 5 Drawing Sheets

Prior Art

Prior Art

HYDRAULIC SHOCK-ABSORBER

BACKGROUND OF THE INVENTION

The present invention relates to a hydraulic shock-absorber having a rod guide for guiding a piston rod sliding in a cylinder which rod guide is provided at one end of the cylinder and which rod guide butts, at an extension stroke end of the piston rod, against a rebound stopper secured to the piston rod.

In a conventional hydraulic shock-absorber used in an automobile etc., there is known a rod guide made of sintered metal as one against which a rebound stopper secured onto a piston rod butts. However, regarding a rod guide made of a sintered metal, there is a problem in view of the increased weight thereof and the increased cost of the production thereof. In recent years, there is such a tendency as a rod guide 8 shown in FIG. 4 which is made by press-working a plate material has been used. However, in a case of the rod guide manufactured by press-working the plate material, there is a problem regarding the strength thereof. Namely, as shown in FIG. 4, when a rod guide 8 butts against a rebound stopper 4, concentrated force is caused in an arrow direction with the result that the rod guide is deformed as shown in FIG. 5, that is, an inner cylindrical portion 8b of the rod guide is deformed-and-displaced upward. As the result thereof, the sliding resistance of the piston rod 5 increases, causing a problem that it cannot slide smoothly. As a rod guide capable of preventing this deformation, there is one in which a bent portion is formed in a part of the butting portion of the rod guide against which portion the rebound stopper butts, as shown, for example, in JP-A-10-281204, or there is another in which a separate member is attached onto the butting portion of the rod guide as shown in JP-Z-2520280, whereby in each of these conventional rod guides the strength against shock is enhanced to thereby prevent the rod guide from being deformed.

SUMMARY OF THE INVENTION

The inventors of the invention have found that, in the above case where the bent portion is formed in a part of butting portion of the rod guide against which part the rebound stopper butts, the rebound stopper does not butt against the part where the bent portion is formed, so that only such a portion of the rebound stopper as to butt against the rod guide comes to be worn locally, thus resulting in a problem of poor durability regarding the rebound stopper. In another case where the separate member is attached to the butting portion of the rod guide against which portion the rebound stopper butts, the number of shock-absorber parts come to increase, resulting in a problem of increased manufacturing costs.

In view of the above, it is an object of the invention to provide a hydraulic shock-absorber in which a force applied to a rod guide by a rebound stopper is dispersed so that the rod guide may not be deformed.

According to the first aspect of the invention capable of realizing the object, there is provided a hydraulic shock-absorber comprising: a cylinder provided with ends; a piston rod sliding in the cylinder; a rod guide for guiding the piston rod sliding in the cylinder which rod guide is located at one of the ends of the cylinder; and a rebound stopper secured to the piston rod which rebound stopper butts against the rod guide at an end of extension-stroke of the piston rod, the rod guide being made of a plate and comprising:

an inner cylindrical portion corresponding to an outer periphery of the piston rod;

a butting planar portion against which the rebound stopper butts and which planar portion is extended radially of the cylinder from a lower end of the inner cylindrical portion;

a butting slant portion against which an outer peripheral portion of the rebound stopper butts and which slant portion is extended downward obliquely from an outer end of the butting planar portion toward an inner periphery of the cylinder; and a cylindrical fitting portion fitted onto the inner periphery of the cylinder which portion is extended upward from a lower end of the butting slant portion. Because of this structure, force applied by the rebound stopper to the rod guide is not concentrated in one direction with the result that the rod guide is prevented from being deformed, whereby the piston rod can always slide smoothly. In the specification, the terms "upward" and "upper" are defined to mean a direction in which the piston rod advances during the extension stroke thereof and a location or level which is spaced in this direction (, that is, in the axial direction of the shock-absorber) more apart from the piston end located within the cylinder than that of another compared therewith, respectively, and the terms "downward" and "lower" are defined to mean another direction reverse to the "upward" direction and another location or level which is nearer from this piston end than that of one compared therewith. Further, the term "axial" or "axially" is defined to mean a direction of the axis of the cylinder which axis is identical with the axis of the shock absorber of the invention.

According to the second aspect of the invention, the butting slant portion may be formed to have a straight, axially sectional shape when viewing the axial section of this slant portion. In this structure, the butting slant portion can be formed easily at a step of manufacturing the rod guide, thus lowering the costs of manufacturing the rod guide.

According to the third aspect of the invention, the butting slant portion may be formed to have a curved, axially sectional shape when viewing the axial section of this slant portion. In this structure, it becomes possible to disperse force, which is applied by the rebound stopper to the rod guide, in directions of an angularly wider range than that of the slant of the straight section to thereby prevent more surely the rod guide from being deformed, thus allowing the piston rod to always slide smoothly.

DESCRIPTION OF THE PREFERRED EMBODIMENTS

Figure 1:
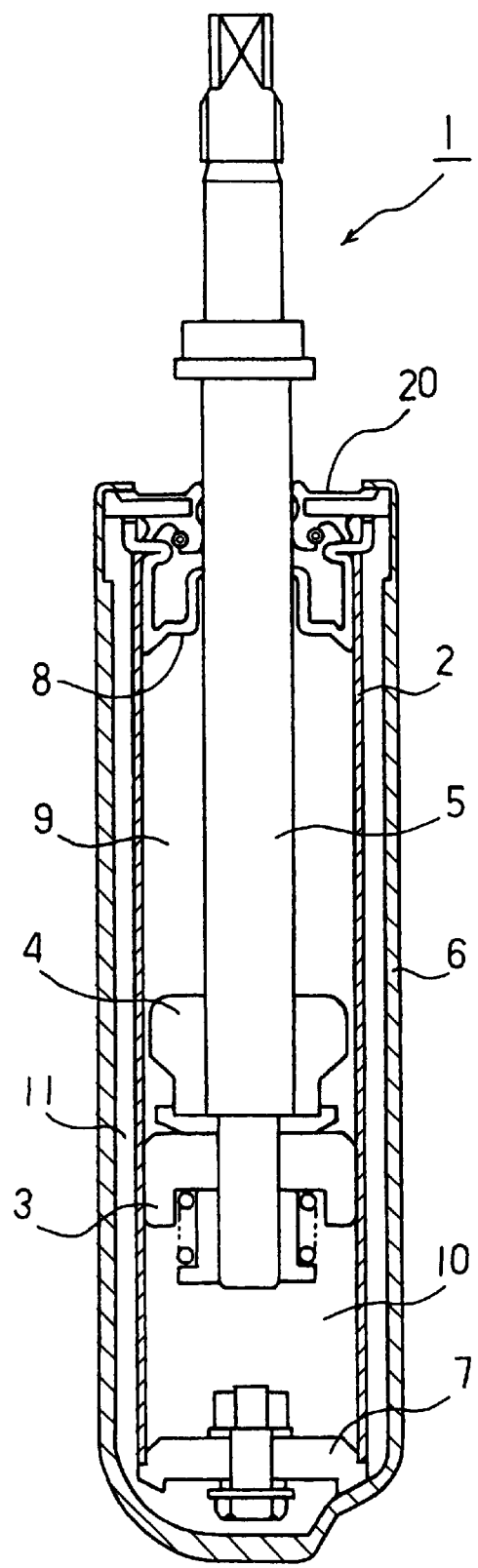
FIG. 1 is a cross-sectional view showing an interior of a hydraulic shock-absorber embodying the invention.

Preferred embodiments of the invention are described below while referring to the drawings. First, the structure of a hydraulic shock-absorber 1 relating to the first embodiment of the invention is summarized while referring to FIG. 1. FIG. 1 is a cross-sectional view showing an interior of the hydraulic shock-absorber 1.

In FIG. 1, the hydraulic shock-absorber 1 has a cylinder 2 filled with oil, a piston rod 5 sliding in the cylinder 2, a piston 3 attached to one end of the piston rod 5, a rod guide 8 provided at one end of the cylinder 2 for guiding the sliding of the piston rod 5, a rebound stopper 4 provided to the piston rod 5 which rebound stopper 4 butts against the rod guide 8 when the piston rod 5 has reached the end of extension stroke of the piston rod 5, an outer tube 6 constituting an outer configuration of the hydraulic shock-absorber 1, and a base 7 secured to the bottom of the cylinder 2.

As shown in FIG. 1, the hydraulic shock-absorber 1 has a configuration of a double casing structure, in which a cylinder 2 which has its top closed by the rod guide 8 and its bottom closed by the base 7 is surrounded by an outer tube 6 which has its top closed by an oil seal 20. Between the cylinder 2 and the outer tube 6 is formed a reservoir chamber 11, in which is contained an inert gas, for example, low-pressure nitrogen gas. The cylinder 2 is filled with oil and has the piston 3 secured to the tip of the piston rod 5, which piston 3 is freely slidably fitted in the cylinder 2 and which piston 3 divides the interior of the cylinder 2 into an upper liquid chamber 9 and a lower liquid chamber 10. The lower liquid chamber 10 communicates with the lower part of the reservoir chamber 11 through a communication path not shown in the drawing. In addition, the piston 3 has an orifice (not shown in the drawings) formed therein so that, when the piston 3 slides in the cylinder 2, oil in the cylinder 2 passes through the orifice to thereby bring about a flow resistance, which attenuates the vibration of the piston 3.

Figure 2:
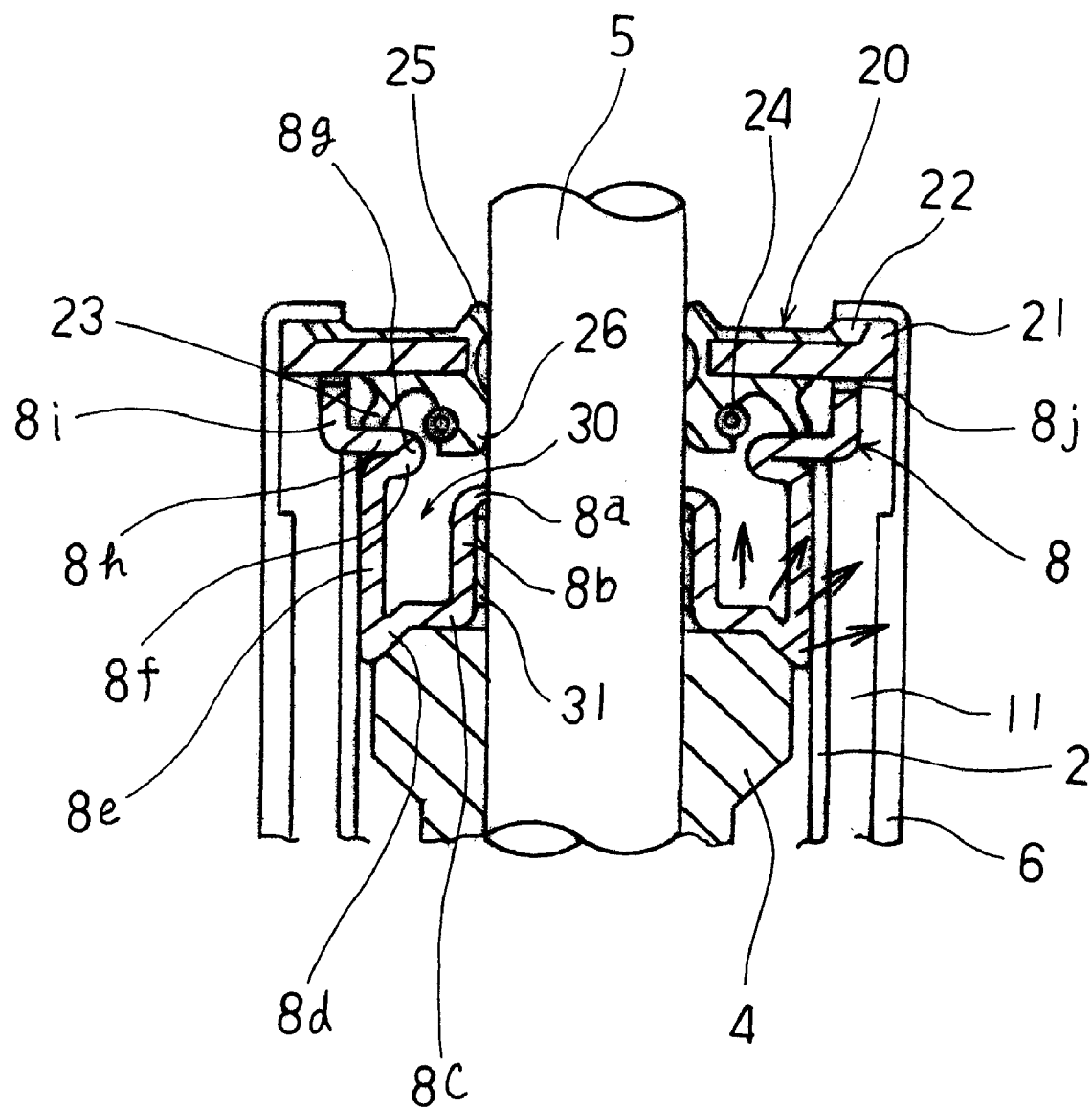
FIG. 2 is a cross-sectional view for showing an upper part of the hydraulic shock-absorber of FIG. 1 to which upper part is secured a rod guide used in the first embodiment of the invention.

Next, the rod guide 8 is described below which constitutes an important portion of the shock-absorber of this embodiment while referring to FIG. 2. FIG. 2 is a cross-sectional view showing the upper part of the hydraulic shock-absorber having the rod guide 8 mounted therein which relates to this embodiment.

The rod guide 8 shown in FIG. 2 is formed by press-working a plate (e.g., JIS-SPC material). At the interior center of the rod guide 8 is formed an inner cylindrical portion 8b corresponding to an outer periphery of the piston rod 5. The upper part of this inner cylinder portion 8b is bent approximately at 90° regarding the axis of the piston rod toward the piston rod 5 to thereby form a rod-inserting-and-passing face 8a which define an opening through which the piston rod is inserted and reciprocated. Onto the inner cylindrical portion 8b is fitted a guide bush 31 with which the piston rod 5 is in sliding contact.

A butting planar portion 8c is radially (, that is, in a radial direction of the shock-absorber) extended from the lower end of the inner cylindrical portion 8b, from the radially outer end of which planar portion 8c is extended downward obliquely toward the inner cylinder a butting slant portion 8d having a straight, axially sectional shape (, that is, this butting slant portion has a straight sectional shape when the section thereof is taken in the axial direction of the shock absorber). Further, from the lower end of the slant butting portion 8d is upward extended a cylindrical fitting portion 8e, which fitting portion 8e has the approximately same diameter as that of an inner diameter of the cylinder 2. From the upper end of the cylindrical fitting portion 8e is present a radially extended portion 8f which is approximately radially extended toward the axis of the shock-absorber 1, which portion 8f has its inner peripheral end folded toward the outer periphery of the shock-absorber 1 while forming a bent portion 8g, from which bent portion 8g is extended a cylinder-abutting portion 8h against which the upper end of the cylinder 2 abuts and which cylinder-abutting portion 8h is in close contact with the radially extended portion 8f. Further, from the radially outer end of the cylinder-abutting portion 8h is upward extended an outer cylindrical portion 8i, at the upper end of which outer cylindrical portion 8i are formed a plurality of oil return openings 8j.

In this structure, the rod guide 8 is secured to the cylinder 2 by press-fitting the cylindrical fitting portion 8e around the inner periphery of the upper portion of the cylinder 2 so that the lower surface of the cylinder-abutting portion 8h may abut against the upper end of the cylinder 2. The rod guide 8 thus secured guides the piston rod 5 in sliding contact therewith, and the bush guide 31 fitted in the cylindrical portion 8b of the rod guide 8 functions to reduce the wear resistance of the piston rod during the sliding of the piston rod 5.

Above the rod guide 8 is provided an oil seal 20 having a seal body 21 and a seal member 22. The seal body 21 is formed to have an annular shape with a hole formed at its center, and the seal member 22 is made of an elastic material such as rubber, which seal member 22 is mounted around the radially inner periphery of the seal body 21 while surrounding the upper and lower faces of the seal body 21. At the upper and lower parts of the radially inner peripheral portion of the seal member 22 are formed a sealing upper lip 25 and a sealing lower lip 26, respectively, which lips 25, 26 are in close contact with the piston rod 5 extended through the rod guide. Further, around the radially outer periphery of the sealing lower lip 26 is mounted a spring member 24 for causing the sealing lower lip 26 to be in intimate contact with the piston rod 5 so as to prevent the oil from leaking. In addition, around the radially outer periphery of the sealing lower lip 26 is provided a check lip 23 protruding downward.

In the assembling of the shock-absorber 1 embodying the invention, the seal body 21 is inserted in the outer tube 6 so that the outer periphery thereof may come in contact with the inner periphery of the outer tube 6, the oil seal 20 being then forced downward until the lower face of the seal body 21 abuts against the upper end of the rod guide 8, and then the upper end portion of the outer tube 6 is folded and caulked, as shown in FIG. 2, toward the piston rod 5, whereby the oil seal 20 is secured to the outer tube 6. In this state, the check lip 23 of the seal member 22 abuts against the upper face of the cylindrical butting portion 8h of the rod guide 8, and an upper chamber 30 comes to be formed between the oil seal 20 and the rod guide 8. In this upper chamber 30 is received oil moved upward from the upper liquid chamber 9 through a gap defined between the piston rod 5 and the guide bush 31. When the oil pressure rises in this upper chamber 30, the check lip 23 is deformed elastically to cause the oil in the upper chamber 30 to pass through the check lip 23. The oil thus passed through the elastically deformed the check lip 23 is returned to the reservoir 11 through the oil return openings 8j formed in the upper end face of the rod guide 8.

Thus, in the hydraulic shock-absorber 1, when the piston rod 5 moves upward as shown in FIG. 2, the rebound stopper 4 butts against the rod guide 8 to thereby limit a further upward motion of the piston rod 5. That is, the position where the rebound stopper 4 butts against the rod guide 8 defines the end of the upward (, that is, advance) stroke of the piston rod 5.

When the rebound stopper 4 butts against the rod guide 8, the radially outer and inner portions of the upper surface of the rebound stopper 4 butt against both of the butting slant portion 8d and the butting planar portion 8c of the rod guide 8, respectively, as shown in FIG. 2. In this case, the butting planar portion 8c receives from the rebound stopper 4 a force indicated by the arrow shown in FIG. 2 beside the piston rod 5 which arrow is parallel with the axis of the piston rod 5. Further, the butting slant portion 8d receives from the rebound stopper 4 another force indicated by arrows shown at the right-hand side in FIG. 2 which arrows are dispersed toward the outer periphery of the rod guide 8. The force thus dispersed toward the outer periphery of the rod guide 8 is received by the outer peripheral portion of the cylinder 2 which is not deformed because it has a high strength. Thus, the force applied by the rebound stopper 4 to the rod guide 8 is not concentrated in one direction parallel with the piston rod 5, so that the rod guide 8 is not deformed, thus allowing the piston rod 5 to slide smoothly. Furthermore, the butting slant portion 8d is formed to have a straight, axial section with the result that it can be easily formed when manufacturing the rod guide 8, thus enabling reducing its manufacturing cost.

Figure 3:
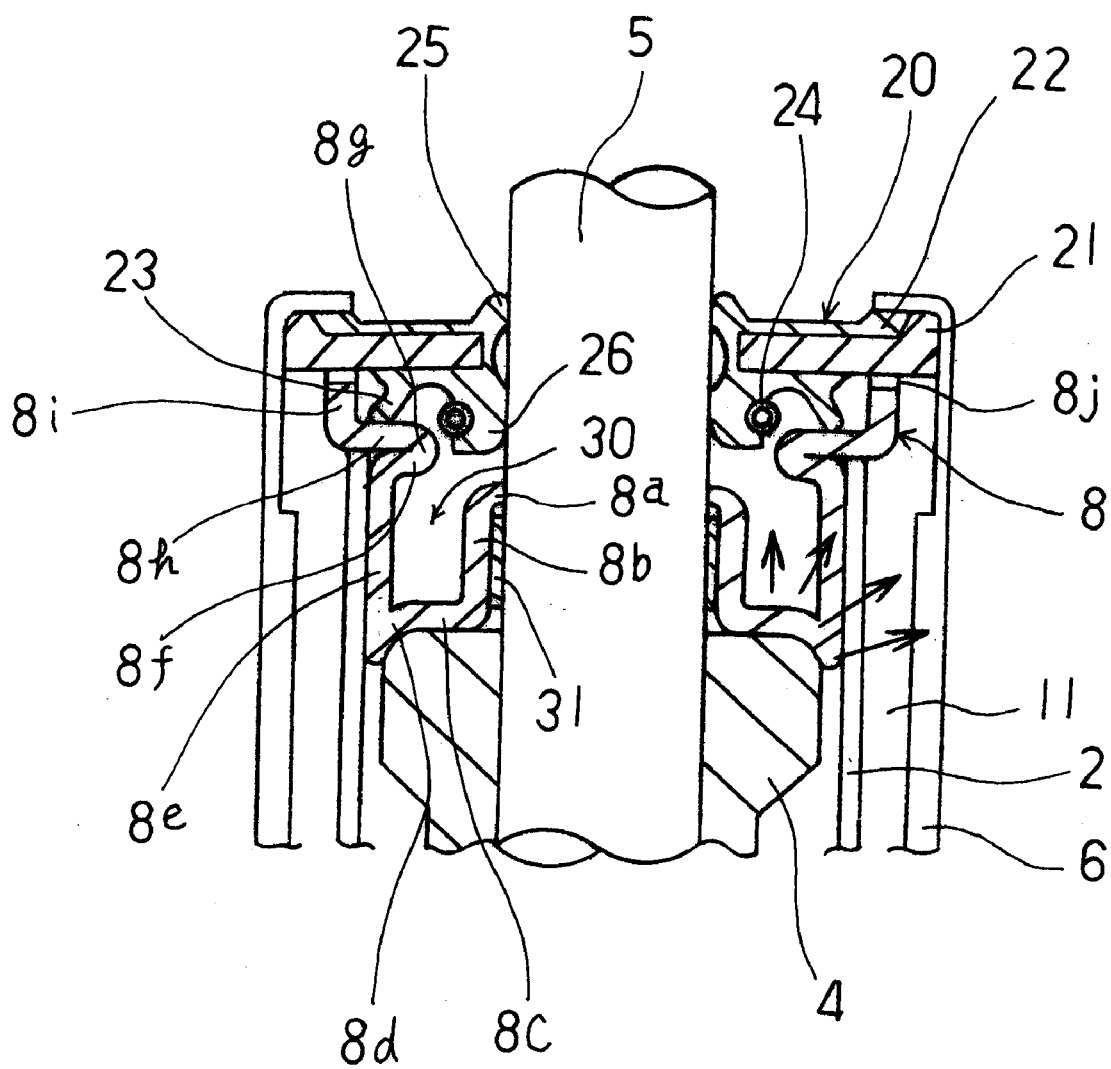
FIG. 3 is a cross-sectional view for showing the upper part of the hydraulic shock-absorber to which is secured another rod guide used in a second embodiment of the invention.
Figure 4:
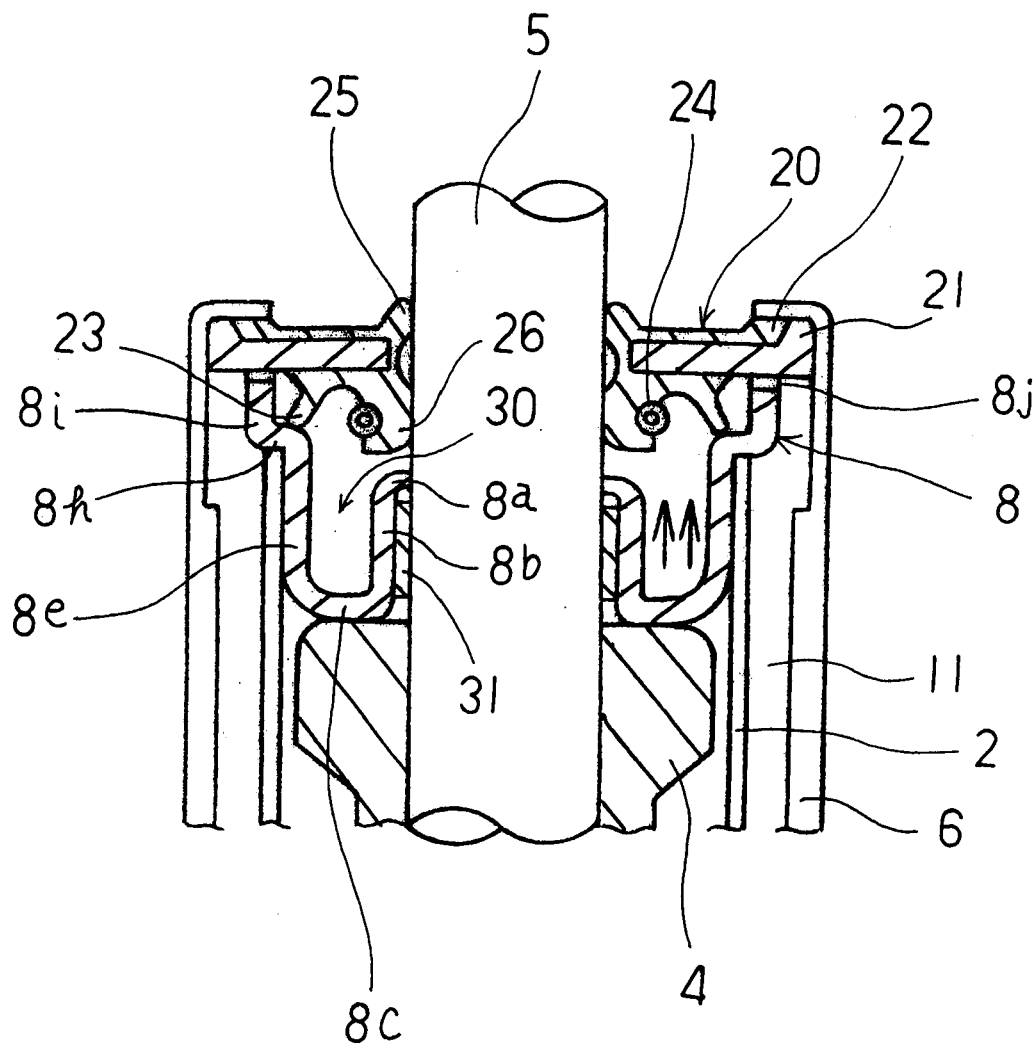
FIG. 4 is a cross-sectional view showing the upper part of a conventional hydraulic shock-absorber to which upper part is secured a conventional rod guide.
Figure 5:
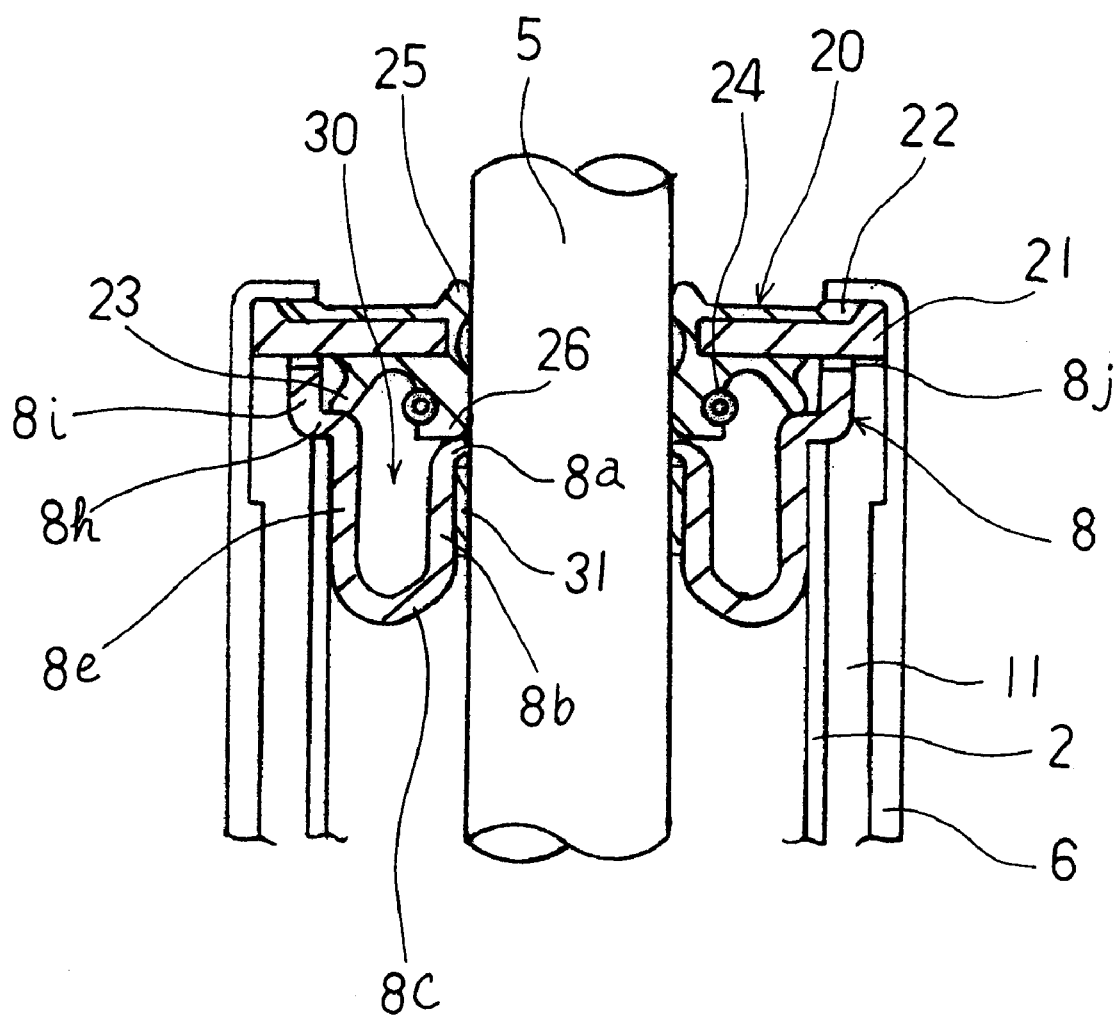
FIG. 5 is a cross-sectional view for showing a state where an unfavorable deformation is caused in the conventional rod guide of FIG. 4.

Although in the above described embodiment (hereinafter called the first embodiment) the butting slant portion 8d of the rod guide 8 has been shown to have the straight, axially sectional shape (, that is, a straight section when the section of the butting slant portion is taken in the axial direction of the shock absorber 1), the invention is not limited to this embodiment. For example, it may be formed to have a curved, axially sectional shape (such as an arch sectional shape when viewing the axially taken section thereof). This embodiment (hereinafter called the second embodiment) is described below with reference to FIG. 3. FIG. 3 is a cross-sectional view showing the upper part of the hydraulic shock-absorber having the rod guide 8 relating to the second embodiment. In the figure, the elements of the hydraulic shock-absorber 1 having the same functions as those of the first embodiment are indicated by the same reference numerals.

In the rod guide 8 according to the second embodiment, as shown in FIG. 3, the butting slant portion 8d is formed to have a curved, axially sectional shape. This enables the force applied by the rebound stopper 4 onto the rod guide 8 to be dispersed in directions dispersed in a wider, angular range than that of the case where the butting slant portion 8d is formed to have the straight, sectional shape, thus further preventing the rod guide 8 from being deformed and also allowing the piston rod 5 to always slide further smoothly. The rod guide 8 related to the second embodiment is the same as that related to the first embodiment except that the butting slant portion 8d is formed to have the curved, sectional shape.

In the embodiments described above in each of which the hydraulic shock-absorber 1 has the rod guide 8 for guiding the piston rod 5 sliding in the cylinder 2 which rod guide 8 is provided at an end of the cylinder 2 and which rod guide 8 butts, at the end of the extension stroke of the piston rod 5, against the rebound stopper 4 secured to the piston rod 5, the rod guide 8 is formed of the plate. Further, the rod guide 8 is provided with the inner cylindrical portion 8b surrounding the outer periphery of the piston rod 5, the butting planar portion 8c against which the rebound stopper 4 butts and which planar portion is radially extended from the lower end portion of the inner cylindrical portion 8b, the butting slant portion 8d against which the outer peripheral portion of the rebound stopper 4 butts and which slant portion is obliquely extended downward toward the inner periphery of the cylinder 2 from the radially outer end portion of the butting planar portion 8c, and the cylindrical fitting portion 8e fitted onto the inner periphery of the cylinder 2 which cylindrical fitting portion 8e is upwardly extended from the lower end portion of the butting slant portion 8d. Because of this structure of the rod guide 8, the force applied to the rod guide 8 from the rebound stopper 4 is prevented from being concentrated to one direction, so that it becomes possible to prevent the rod guide 8 from being deformed due to the concentrated force and to make the piston rod 5 always slide smoothly.

Further, since in the first embodiment the butting slant portion 8d is formed to have the straight, axially sectional shape, the butting slant portion 8d can be formed easily in the step of manufacturing the rod guide 8, thus reducing its manufacturing costs.

Further, since in the second embodiment the slant butting portion 8d is formed to have the curved, axially sectional shape, the slant butting portion can disperse in a widely dispersed directions the force applied by the rebound stopper 4 to the rod guide 8, thus preventing the rod guide 8 from being deformed and also allowing the piston rod 5 to always slide smoothly.

Although in the above-described embodiments, the butting face at which both of the rod guide 8 and the rebound stopper 4 butt against each other has been shown to be constituted by the butting planar portion 8c extended radially and by the butting slant portion 8d extended axially obliquely toward the inner cylinder, the present invention is not limited to these shapes. That is, for example, the whole of the bottom of the rod guide 8 may be formed to have a curved, axially sectional shape or a slant extended downward toward the outer periphery of the rod guide 8 insofar as these shapes can disperse the force, which is applied by the rebound stopper 4, toward the outer peripheral side of the rod guide 8.

As clear from the above description, in the first aspect of the invention, the force applied onto the rod guide from the rebound stopper is not concentrated in one direction, whereby the rod guide is prevented from being deformed, thus enabling the piston rod to always slide smoothly.

Further, in the second aspect of the invention, the butting slant portion of the rod guide can be formed easily in the step of manufacturing the rod guide, thereby enabling its manufacturing costs to be reduced.

In the third aspect of the invention, the force applied onto the rod guide from the rebound stopper can be dispersed in widely dispersed directions, whereby the rod guide is prevented from being deformed, thereby allowing the piston rod to always slide smoothly.

What is claimed is:

1. A hydraulic shock-absorber comprising a cylinder, a piston rod sliding in the cylinder which piston rod is provided with a rebound stopper secured to the piston rod, a rod guide for guiding said piston rod which rod guide is provided at an end of said cylinder and which rod guide butts against said rebound stopper at an extension stroke and of said piston rod, said rod guide being formed of a plate, said rod guide comprising an inner cylindrical portion located in correspondence to an outer periphery of said piston rod, a butting planar portion extending radially of said cylindrical portion from a lower end of said inner cylindrical portion against which butting planar portion said rebound stopper buts, a butting slant portion extending downward obliquely toward said cylinder from an outer end of said butting planar portion against which butting slant portion a radially outer portion of said rebound stopper butts, and a cylindrical fitting portion extending upward from a lower end of said slant butting portion which cylindrical fitting portion is fitted onto an inner peripheral face of said cylinder.

2. The hydraulic shock-absorber according to claim 1, wherein said slant butting portion is formed to have a straight, axially sectional shape.

3. The hydraulic shock-absorber according to claim 1, wherein said slant butting portion is formed to have a curved, axially sectional shape.

* * * * *